US008655061B2

(12) United States Patent
Itoh

(10) Patent No.: US 8,655,061 B2
(45) Date of Patent: Feb. 18, 2014

(54) IMAGE PROCESSING APPARATUS AND IMAGE PROCESSING METHOD FOR PERFORMING A CONVOLUTION OPERATION

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 17 days.

(21) Appl. No.: 13/355,085

(22) Filed: Jan. 20, 2012

(65) Prior Publication Data

US 2013/0044946 A1 Feb. 21, 2013

(30) Foreign Application Priority Data

Aug. 15, 2011 (JP) ................................ 2011-177530

(51) Int. Cl.
*G06K 9/00* (2006.01)

(52) U.S. Cl.
USPC .......................................................... 382/165

(58) Field of Classification Search
None
See application file for complete search history.

(56) References Cited

U.S. PATENT DOCUMENTS 4,639,771 A * 1/1987 Hattori et al. ................ 358/523
5,909,506 A * 6/1999 Goto ............................ 382/167
6,628,842 B1 * 9/2003 Nagao .......................... 382/266
6,707,950 B1 * 3/2004 Burns et al. ................... 382/254
2005/0286795 A1 * 12/2005 Zhang .......................... 382/268
2006/0110065 A1 * 5/2006 Huang et al. .................. 382/275
2007/0285441 A1 12/2007 Fukuoka
2008/0043852 A1 * 2/2008 Park et al. ................ 375/240.27
2009/0041343 A1 * 2/2009 Itoh .............................. 382/162
2009/0167904 A1 7/2009 Matsushima
2009/0285308 A1 * 11/2009 Panchapakesan et al. ........................ 375/240.24
2010/0266211 A1 * 10/2010 Vandame ...................... 382/199
2012/0020552 A1 * 1/2012 Itoh .............................. 382/163
2013/0129233 A1 * 5/2013 Schiller et al. ................ 382/228

FOREIGN PATENT DOCUMENTS

JP A-2002-9590 1/2002
JP A-2007-312304 11/2007
JP A-2009-157647 7/2009

* cited by examiner

*Primary Examiner* — Daniel Mariam
*Assistant Examiner* — Feng Niu
(74) *Attorney, Agent, or Firm* — Oliff PLC

(57) ABSTRACT

Provided is an image processing apparatus including an extraction unit that extracts a color boundary of an image, an influence value calculation unit that calculates an influence value indicating the degree of an influence of the color boundary on a pixel, a setting unit that sets a coefficient for a convolution operation in accordance with the color boundary extracted in the extraction unit and the influence value calculated in the influence value calculation unit, and an operation unit that performs a convolution operation using the coefficient set by the setting unit.

18 Claims, 17 Drawing Sheets

FIG. 3A
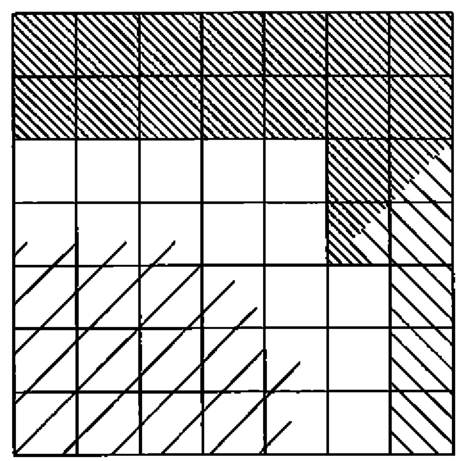
FIG. 3B
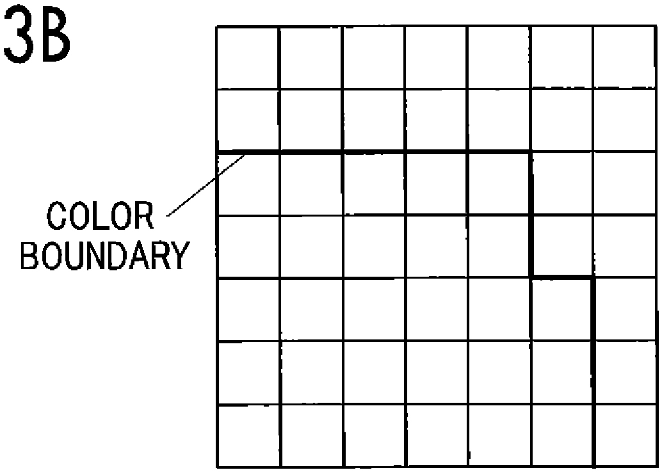
FIG. 3C
INFLUENCE VALUE
| 6 | 6 | 6 | 6 | 5 | 4 | 3 |
|---|---|---|---|---|---|---|
| 8 | 8 | 8 | 8 | 8 | 7 | 4 |
| 8 | 8 | 8 | 9 | 9 | 8 | 5 |
| 6 | 6 | 6 | 7 | 9 | 8 | 6 |
| 4 | 4 | 5 | 6 | 8 | 9 | 6 |
| 2 | 3 | 4 | 5 | 6 | 7 | 6 |
| 1 | 2 | 4 | 5 | 6 | 7 | 6 |

FIG. 4A
COLOR CONCENTRATION
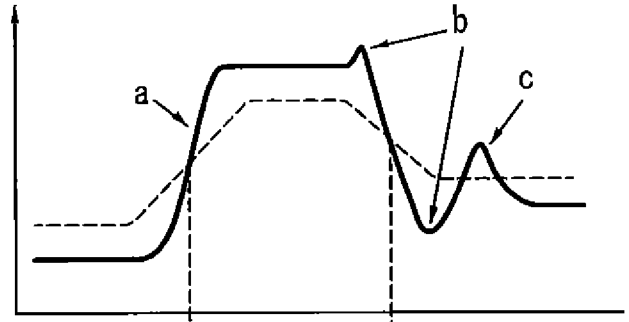
FIG. 4B
INFLUENCE VALUE
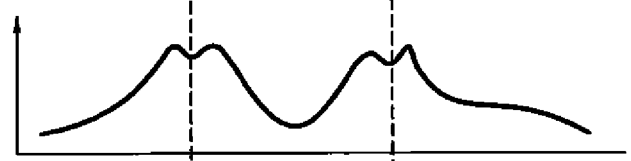
FIG. 4C
DISPLACEMENT FROM LOCAL AVERAGE (ABSOLUTE VALUE)
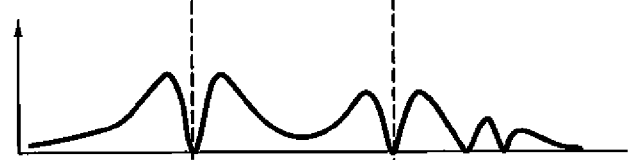
FIG. 4D
DIFFERENTIAL VALUE (ABSOLUTE VALUE)
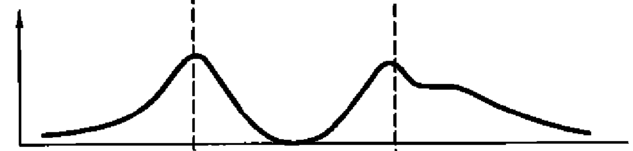
FIG. 4E
COLOR DIFFERENCE (ABSOLUTE VALUE)
FIG. 4F
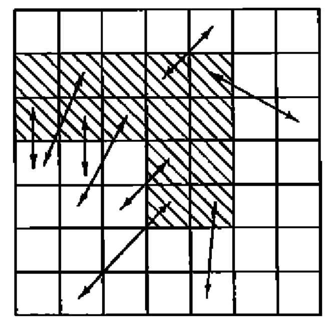

FIG. 9A
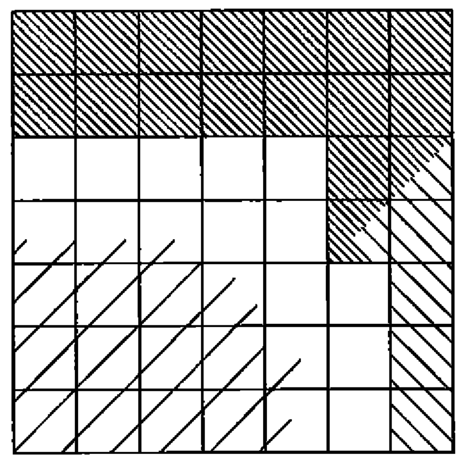
FIG. 9B
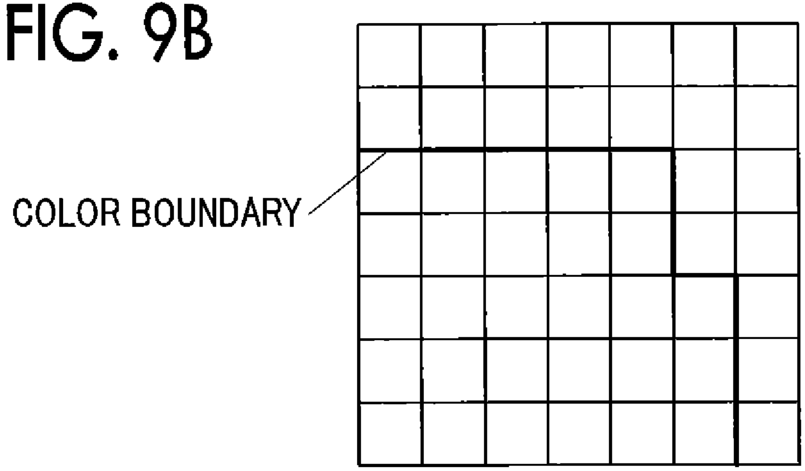
FIG. 9C
INFLUENCE VALUE
| 6 | 6 | 6 | 6 | 5 | 4 | 3 |
|---|---|---|---|---|---|---|
| 8 | 8 | 8 | 8 | 8 | 7 | 4 |
| 8 | 8 | 8 | 9 | 9 | 8 | 5 |
| 6 | 6 | 6 | 7 | 9 | 8 | 6 |
| 4 | 4 | 5 | 6 | 8 | 9 | 6 |
| 2 | 3 | 4 | 5 | 6 | 7 | 6 |
| 1 | 2 | 4 | 5 | 6 | 7 | 6 |

FIG. 9D

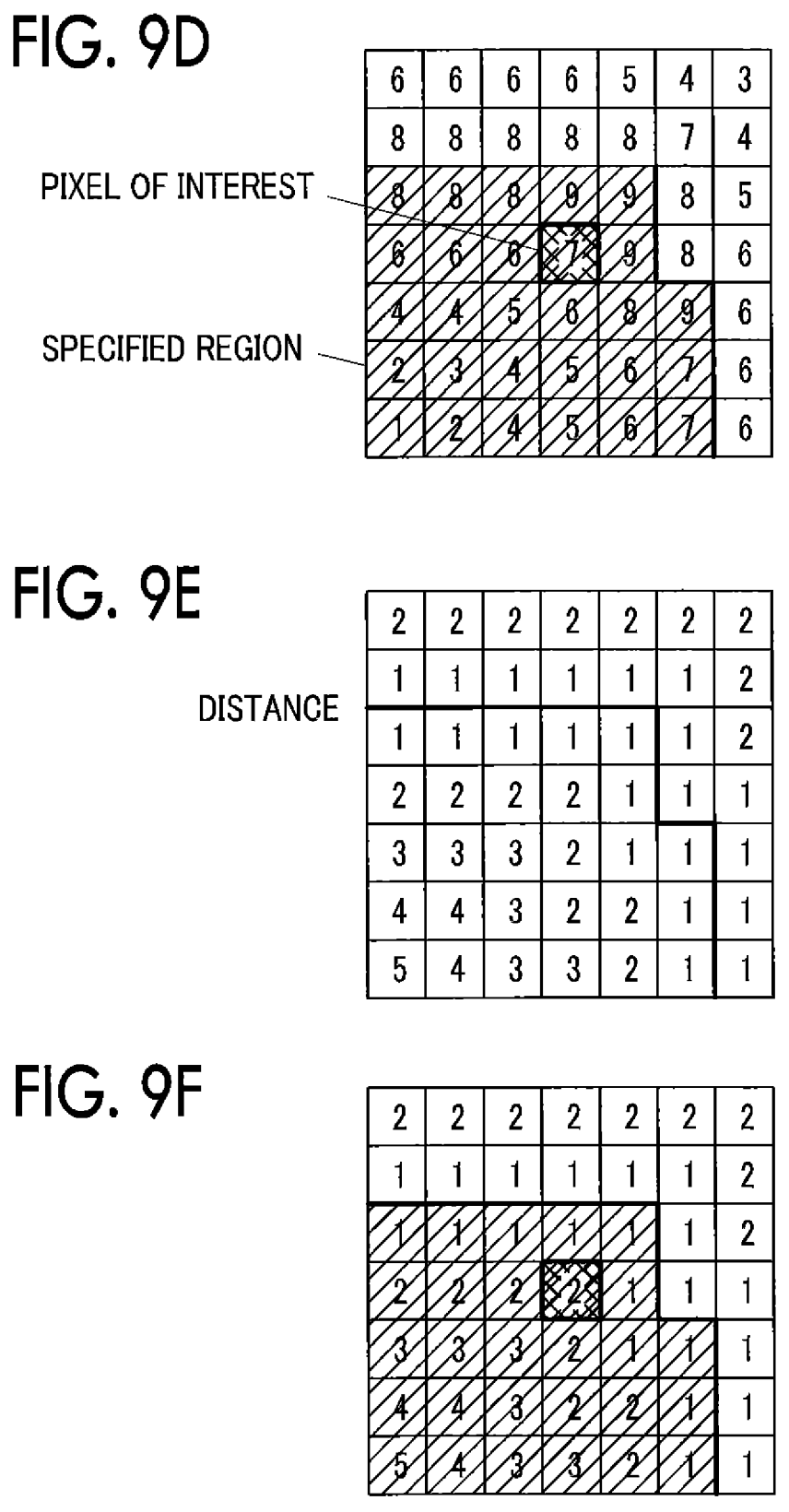

| | | | | | | |
|---|---|---|---|---|---|---|
| 6 | 6 | 6 | 6 | 5 | 4 | 3 |
| 8 | 8 | 8 | 8 | 8 | 7 | 4 |
| 8 | 8 | 8 | 9 | 9 | 8 | 5 |
| 6 | 6 | 6 | 7 | 9 | 8 | 6 |
| 4 | 4 | 5 | 6 | 8 | 9 | 6 |
| 2 | 3 | 4 | 5 | 6 | 7 | 6 |
| 1 | 2 | 4 | 5 | 6 | 7 | 6 |

FIG. 9E

| | | | | | | |
|---|---|---|---|---|---|---|
| 2 | 2 | 2 | 2 | 2 | 2 | 2 |
| 1 | 1 | 1 | 1 | 1 | 1 | 2 |
| 1 | 1 | 1 | 1 | 1 | 1 | 2 |
| 2 | 2 | 2 | 2 | 1 | 1 | 1 |
| 3 | 3 | 3 | 2 | 1 | 1 | 1 |
| 4 | 4 | 3 | 2 | 2 | 1 | 1 |
| 5 | 4 | 3 | 3 | 2 | 1 | 1 |

FIG. 9F

| | | | | | | |
|---|---|---|---|---|---|---|
| 2 | 2 | 2 | 2 | 2 | 2 | 2 |
| 1 | 1 | 1 | 1 | 1 | 1 | 2 |
| 1 | 1 | 1 | 1 | 1 | 1 | 2 |
| 2 | 2 | 2 | 2 | 1 | 1 | 1 |
| 3 | 3 | 3 | 2 | 1 | 1 | 1 |
| 4 | 4 | 3 | 2 | 2 | 1 | 1 |
| 5 | 4 | 3 | 3 | 2 | 1 | 1 |

FIG. 9G

COEFFICIENT

| | | | | | | |
|---|---|---|---|---|---|---|
| 0 | 0 | 0 | 0 | 0 | 0 | 0 |
| 0 | 0 | 0 | 0 | 0 | 0 | 0 |
| 1 | 1 | 1 | 1 | 1 | 0 | 0 |
| 2 | 2 | 2 | 2 | 2 | 0 | 0 |
| 3 | 3 | 3 | 3 | 2 | 2 | 0 |
| 5 | 5 | 4 | 4 | 3 | 2 | 0 |
| 9 | 8 | 7 | 6 | 4 | 2 | 0 |

IMAGE
11
COLOR BOUNDARY EXTRACTION UNIT
12
INFLUENCE VALUE CALCULATION UNIT
13
COEFFICIENT SETTING UNIT
14
ARITHMETIC OPERATION UNIT
15
DISTANCE CALCULATION UNIT
16
REPRESENTATIVE COLOR CONVERSION UNIT
17
REPRESENTATIVE COLOR RESELECTION UNIT
LIMITED COLOR IMAGE

FIG. 12A
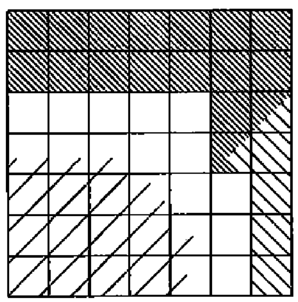
FIG. 12H
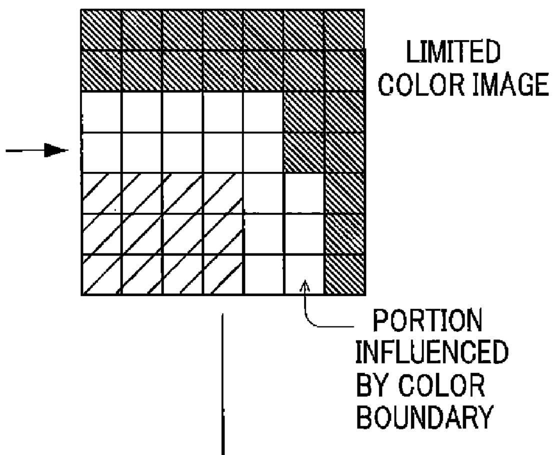
FIG. 12B
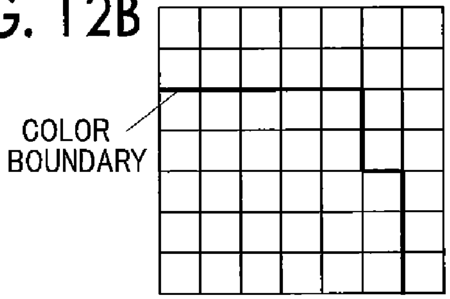
FIG. 12C
INFLUENCE VALUE
| 6 | 6 | 6 | 6 | 5 | 4 | 3 |
|---|---|---|---|---|---|---|
| 8 | 8 | 8 | 8 | 8 | 7 | 4 |
| 8 | 8 | 8 | 9 | 9 | 8 | 5 |
| 6 | 6 | 6 | 7 | 9 | 8 | 6 |
| 4 | 4 | 5 | 6 | 8 | 9 | 6 |
| 2 | 3 | 4 | 5 | 6 | 7 | 6 |
| 1 | 2 | 4 | 5 | 6 | 7 | 6 |
FIG. 12E
DISTANCEE
| 2 | 2 | 2 | 2 | 2 | 2 | 2 |
|---|---|---|---|---|---|---|
| 1 | 1 | 1 | 1 | 1 | 1 | 2 |
| 1 | 1 | 1 | 1 | 1 | 1 | 2 |
| 2 | 2 | 2 | 2 | 1 | 1 | 1 |
| 3 | 3 | 3 | 2 | 1 | 1 | 1 |
| 4 | 4 | 3 | 2 | 2 | 1 | 1 |
| 5 | 4 | 3 | 3 | 2 | 1 | 1 |
FIG. 12D
PIXEL OF INTEREST
SPECIFIED REGION
| 6 | 6 | 6 | 6 | 5 | 4 | 3 |
|---|---|---|---|---|---|---|
| 8 | 8 | 8 | 8 | 8 | 7 | 4 |
| 8 | 8 | 8 | 9 | 9 | 8 | 5 |
| 6 | 6 | 6 | 7 | 9 | 8 | 6 |
| 4 | 4 | 5 | 6 | 8 | 9 | 6 |
| 2 | 3 | 4 | 5 | 6 | 7 | 6 |
| 1 | 2 | 4 | 5 | 6 | 7 | 6 |
FIG. 12F
| 2 | 2 | 2 | 2 | 2 | 2 | 2 |
|---|---|---|---|---|---|---|
| 1 | 1 | 1 | 1 | 1 | 1 | 2 |
| 1 | 1 | 1 | 1 | 1 | 1 | 2 |
| 2 | 2 | 2 | 2 | 1 | 1 | 1 |
| 3 | 3 | 3 | 2 | 1 | 1 | 1 |
| 4 | 4 | 3 | 2 | 2 | 1 | 1 |
| 5 | 4 | 3 | 3 | 2 | 1 | 1 |
(CONT).

(FIG. 12 Continued)

COEFFICIENT

| | | | | | | |
|---|---|---|---|---|---|---|
| 0 | 0 | 0 | 0 | 0 | 0 | 0 |
| 0 | 0 | 0 | 0 | 0 | 0 | 0 |
| 1 | 1 | 1 | 1 | 1 | 0 | 0 |
| 2 | 2 | 2 | 2 | 2 | 0 | 0 |
| 3 | 3 | 3 | 3 | 2 | 2 | 0 |
| 5 | 5 | 4 | 4 | 3 | 2 | 0 |
| 9 | 8 | 7 | 6 | 4 | 2 | 0 |

CONVOLUTION OPERATION 51
52
53
54
STORAGE
42
COMPUTER
63
READDUT UNIT
61
CPU
62
INTERNAL MEMORY
65
INTERFACE
66
COMMUNICATION UNIT
64
HARD DISK
COMMUNICATION PATH
41
PROGRAM

IMAGE PROCESSING APPARATUS AND IMAGE PROCESSING METHOD FOR PERFORMING A CONVOLUTION OPERATION

CROSS-REFERENCE TO RELATED APPLICATIONS

This application is based on and claims priority under 35 USC 119 from Japanese Patent Application No. 2011-177530 filed Aug. 15, 2011.

BACKGROUND (i) Technical Field

The present invention relates to an image processing apparatus, a non-transitory computer readable medium, and an image processing method.

(ii) Related Art

Deterioration caused by the color boundary may be generated in images. For example, in images read out by an image reading apparatus, colors which do not exist in an original image may be generated in the color boundary due to the reading error. In addition, when restoration is performed on images which are encoded or compressed using a encoding system or a compression system in which methods of performing frequency transforms such as a discrete cosine transform or a discrete Fourier transform for each block and performing quantization are used, a block noise called, for example, a mosquito noise or the like may be generated. Further, a change in the color or the concentration is performed intentionally on the color boundary, for example, in enhancement filtering, but in images which are excessively corrected due to this process, a referrer may feel that deterioration is generated in the color boundary portion.

On the other hand, there is a smoothing process as a technique for removing the noise component or the difference in the color. The smoothing process is basically performed by calculating an average value of the colors in the pixel range having a predetermined size.

SUMMARY

According to an aspect of the invention, there is provided an image processing apparatus including: an extraction unit that extracts a color boundary of an image; an influence value calculation unit that calculates an influence value indicating the degree of an influence of the color boundary on a pixel; a setting unit that sets a coefficient for a convolution operation in accordance with the color boundary extracted in the extraction unit and the influence value calculated in the influence value calculation unit; and an operation unit that performs a convolution operation using the coefficient set by the setting unit.

BRIEF DESCRIPTION OF THE DRAWINGS

Exemplary embodiments of the present invention will be described in detail based on the following figures, wherein:

FIGS. 3A to 3E are explanatory diagrams illustrating a specific example in an example of the operation according to the first exemplary embodiment of the invention.

FIGS. 4A to 4F are explanatory diagrams illustrating a specific example of calculation of an influence value.

FIGS. 9A to 9G are explanatory diagrams illustrating a specific example in an example of the operation according to the second exemplary embodiment of the invention.

FIGS. 12A to 12I are explanatory diagrams illustrating a specific example in an example of the operation according to the third exemplary embodiment of the invention.

DETAILED DESCRIPTION

Figure 1:
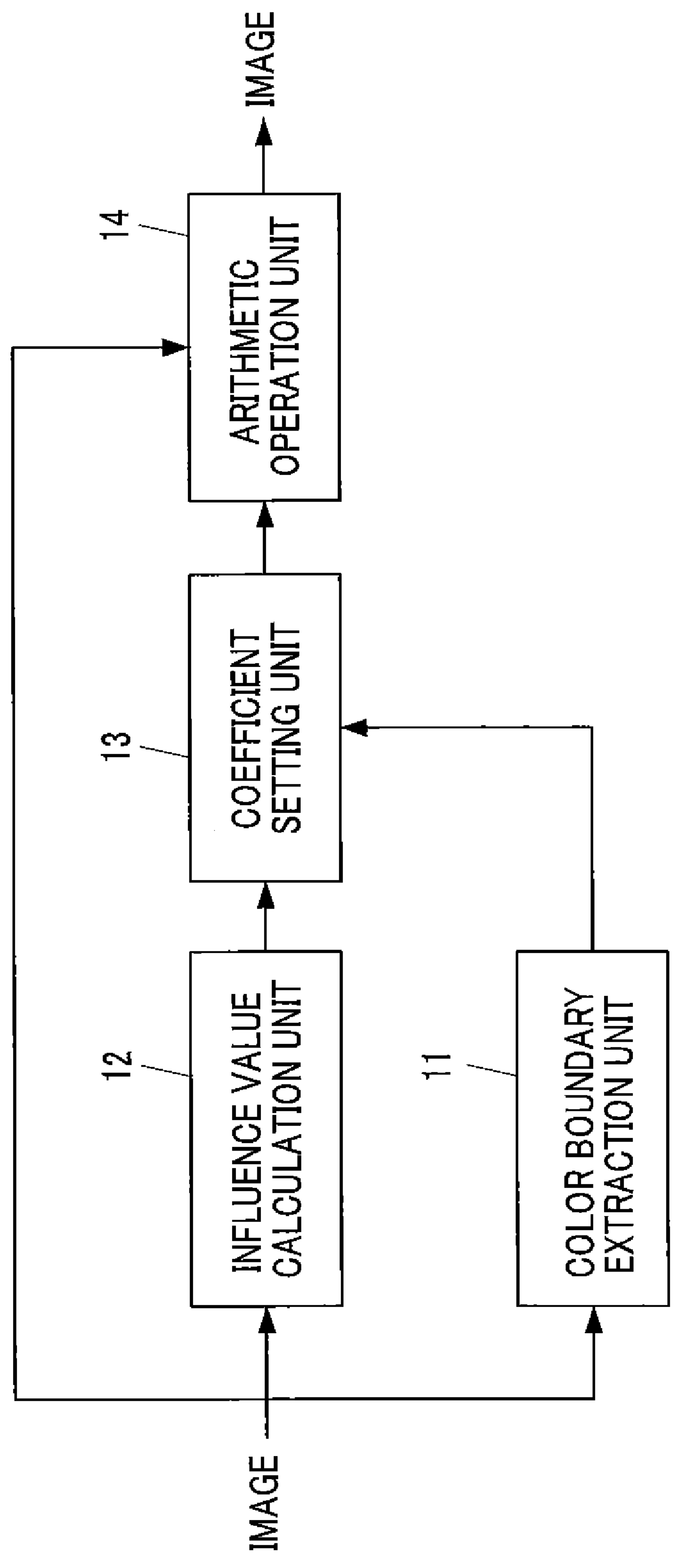
FIG. 1 is a configuration diagram illustrating a first exemplary embodiment of the invention.

FIG. 1 is a configuration diagram illustrating a first exemplary embodiment of the invention. In the drawing, 11 denotes a color boundary extraction unit, 12 denotes an influence value calculation unit, 13 denotes a coefficient setting unit, and 14 denotes an arithmetic operation unit. The color boundary extraction unit 11 extracts the color boundary of an image. As an extraction method, a method used hitherto may be used. For example, there are various methods such as binarization processing in which a moving average value is set to a threshold, or a method in which an edge detection filter is used. In addition, the boundary may be extracted for each color component including a brightness component, and the color boundary may be extracted using extraction results of plural color components.

The influence value calculation unit 12 calculates an influence value indicating the degree of the influence of the color boundary on pixels. For example, when an image is read out by the above-mentioned image reading apparatus or when excessive enhancement is performed by enhancement filtering, and the like, the influence becomes stronger as the influence value is closer to the color boundary and the color difference in the color boundary is larger, and the influence becomes smaller as the influence value is farther from the color boundary and the color difference is smaller. The degree of the influence received from such a color boundary is calculated as the influence value. For example, the influence value may be calculated using an absolute value of the difference from an average color value of a local region, a differential value, the color difference within the local region, and the like. Of course, when the influence received from the color boundary is digitized, the influence value may be calculated using various other values and various methods. The specific example will be described later.

The coefficient setting unit 13 sets a coefficient for convolution operation in accordance with the color boundary extracted in the color boundary extraction unit 11 and the influence value calculated in the influence value calculation unit 12. More specifically, a pixel to be convoluted in the arithmetic operation unit 14 is set to a pixel of interest, and a coefficient for convolution operation corresponding to a pixel of the region separated by the color boundary including the pixel of interest is calculated in accordance with the influence value. The influence value indicates the degree of the influence received from the color boundary, but a coefficient is set so that a pixel which does not receive the influence from the color boundary than another pixel at the time of the convolution operation is used as a priority. For this reason, the coefficient is set smaller as the influence value is larger, and the coefficient is set larger as the influence value is smaller. For example, the coefficient may be set from the influence value using various functions and the like in which the coefficient decreases with an increase in the influence value.

The arithmetic operation unit 14 performs the convolution operation using the coefficient set by the coefficient setting unit 13. When the convolution operation is performed, each of the coefficients is divided by the sum of the used coefficients, and is normalized and then operated. When the convolution operation is performed in a certain pixel (pixel of interest), the coefficient corresponding to the pixel of the region, separated by the color boundary, which includes the pixel of interest is used, and those of the pixels except for the region are not used, or are operated by setting the coefficient to 0.

Meanwhile, when the influence value calculated in the influence value calculation unit 12 is in the range of a predetermined value, the setting of the coefficient by the coefficient setting unit 13 and the convolution operation by the arithmetic operation unit 14 are performed. Otherwise, the convolution operation by the arithmetic operation unit 14 or the further setting of the coefficient by the coefficient setting unit 13 may not be performed. The processing amount decreases as compared to the case in which the setting of the coefficient and the convolution operation are performed in all the pixels.

Hereinafter, an example of the operation according to the first exemplary embodiment of the invention will be described using a specific example. Meanwhile, the following description will be made, as a specific example, in which the pixel to be convoluted is set to a pixel of interest, and the region with a predetermined size including the pixel of interest is set to a region to be processed.

Figure 2:
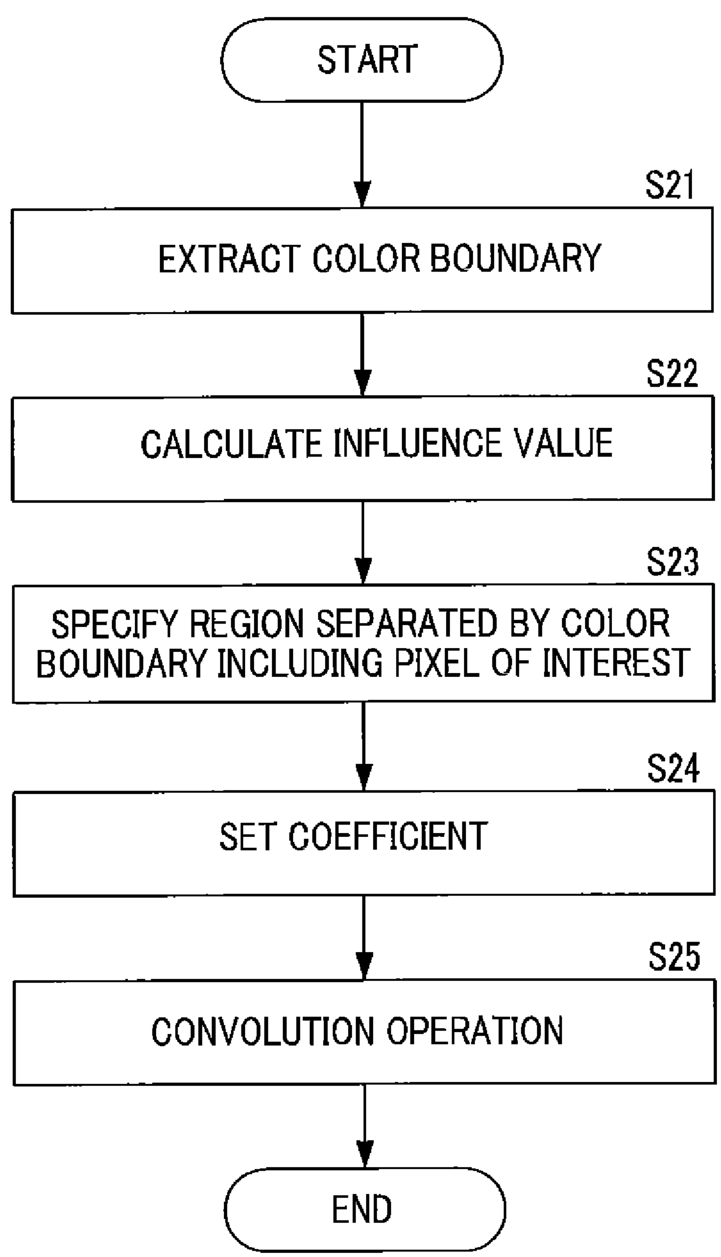
FIG. 2 is a flow diagram illustrating an example of an operation according to the first exemplary embodiment of the invention.
Figure 3D:
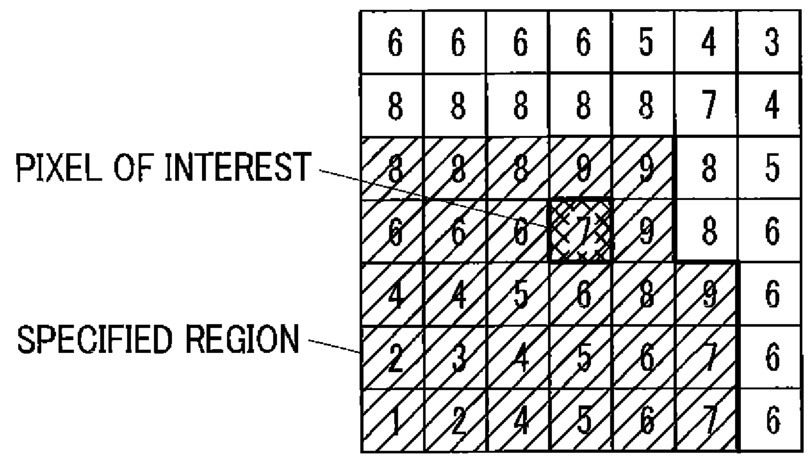

FIG. 2 is a flow diagram illustrating an example of the operation according to the first exemplary embodiment of the invention, and FIGS. 3A to 3E are explanatory diagrams illustrating a specific example in an example of the operation according to the first exemplary embodiment of the invention. FIG. 3A shows a specific example of a region to be processed in a given image. In FIGS. 3A to 3E, one square corresponds to one or plural pixels. For convenience of illustration, the difference in the color is shown by the difference in the diagonal line. The pixel in which a value is obtained by performing the convolution operation in the arithmetic operation unit 14 is set to a pixel of interest, and the region to be processed is set to a region with a predetermined size including the pixel of interest.

In step S21, the color boundary extraction unit 11 extracts the color boundary of the image. When the color boundary is extracted from the image shown in FIG. 3A, the position shown by the thick line in FIG. 3B is extracted as the color boundary.

In step S22, the influence value calculation unit 12 calculates the influence value indicating the degree of the influence of the color boundary on the pixel. FIGS. 4A to 4F are explanatory diagrams illustrating a specific example of the calculation of the influence value. In the example shown in FIGS. 4A to 4F, an absolute value of the difference between the average color value of the local region and the color value of the pixel, an absolute value of the differential value, and an absolute value of the color difference within the local region are used, and the linear sum of each of the values is set to the influence value. In FIG. 4A, a change in the color value in a certain direction of the image is shown by the solid line. Meanwhile, the a portion shows a state in which the color boundary is out of focus due to a reading error, the b portion shows a state in which excessive enhancement is performed by the filter processing, and the c portion shows a noise component generated by the compression processing and the like.

Regarding an absolute value of the difference between the average color value of the local region and the color value of the pixel, a certain pixel is set to a target pixel, the region having a predetermined size smaller than the region to be processed shown in FIGS. 3A to 3E including the target pixel is set to a local region, and thus the absolute value of the difference between the average color value in the local region and the color value of the target pixel is obtained. When the target pixels are changed in order and obtained, for example, a change shown in FIG. 4C is made. In addition, the average color value is shown by the dashed line in FIG. 4A.

Regarding an absolute value of the differential value, the value of a differential filter in the above-mentioned local region is set to a differential value in the target pixel, and thus the absolute value is obtained. When the target pixels are changed in order and obtained, for example, a change shown in FIG. 4D is made. Although depending on the size of the local region, the irregularities such as the a, b, and c portions are averaged in this example and the differential value is calculated. The change in the differential value becomes smaller than the change in the color value shown in FIG. 4A.

Regarding an absolute value of the color difference within the local region, the absolute value of the maximum value or the sum of the color difference is obtained with respect to the pixels within the above-mentioned local region. When the target pixels are changed in order and obtained, for example, a change shown in FIG. 4E is made. When the sum of the color difference between the pixels is obtained, the distance from the pixel of interest (short distance of the distances from two pixels of which the color difference is obtained to the pixel of interest) is used as a weight and the color difference and the distance are multiplied together, whereby the total sun thereof (total sum of products) or the maximum value may be obtained. Further, when the color difference between the pixels is obtained, the pixel of the local region is divided into the color boundary portion and the non-boundary portion, and thus the color difference between the pixel of the color boundary portion and the pixel of the non-boundary portion may be obtained. Alternatively, the pixel of the local region is binarized, and thus the color difference between the pixel of one value and the pixel of the other value may be obtained. FIG. 4F shows a case in which the pixels are divided into the pixels which are drawn by the diagonal line and the pixels which are not drawn by the diagonal line, and the color difference may be obtained by combination of the pixels which are drawn by the diagonal line and the pixels which are not drawn by the diagonal line. In FIG. 4F, some combinations thereof are shown by the arrows. The number of combinations of the pixels decreases rather than obtain the color difference by combination of all the pixels of the local region.

The linear sum of the absolute value of the difference between the average color value of the local region and the color value of the pixel, the absolute value of the differential value, and the absolute value of the color difference within the local region is calculated, and the calculated valued is set to an influence value. A change in the calculated influence value is shown in FIG. 4B. This influence value becomes larger as it is closer to the color boundary, and the influence value becomes smaller as it is farther from the color boundary. In addition, the influence value becomes larger as the color difference in the color boundary is larger, and the degree of the influence is shown.

Meanwhile, the sizes of the local region at the time of obtaining the absolute value of the difference between the average color value of the local region and the color value of the pixel, the absolute value of the differential value, and the absolute value of the color difference within the local region may be different from each other. In addition, other values may be used, and choices thereof may be made including the above-mentioned values.

FIG. 3C shows an example of the influence value calculated in the influence value calculation unit 12 from the image shown in FIG. 3A. The influence value becomes larger as it is closer to the color boundary, and the influence value becomes smaller as it is farther than the color boundary.

In FIG. 2, the processing of steps S21 and S22 is shown in order, but the processing of steps S21 and S22 may be performed in parallel.

Figure 3E:
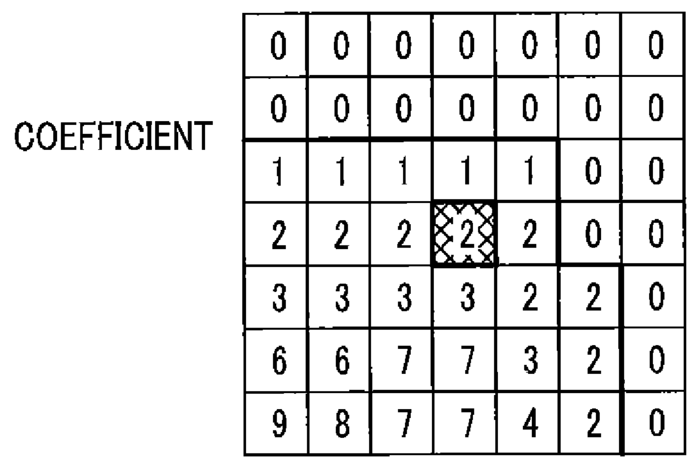
Figure 5A:
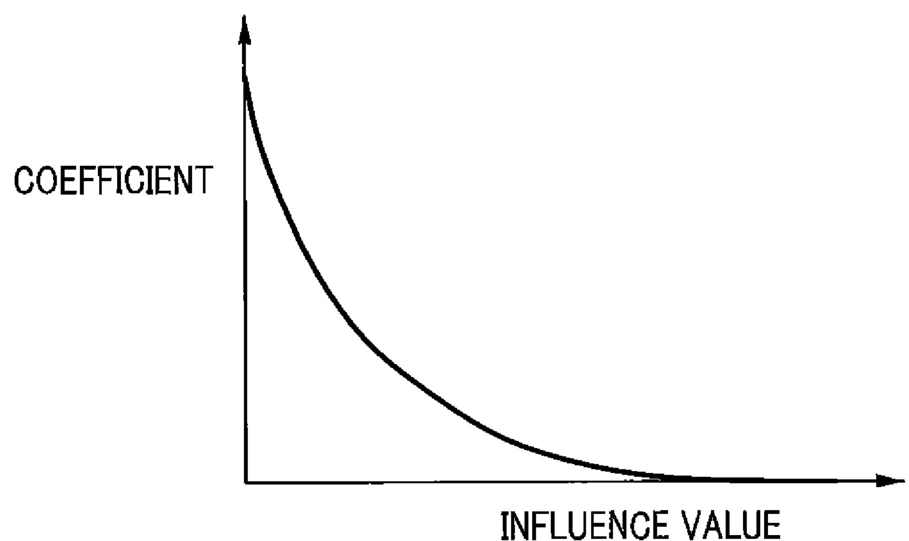
FIGS. 5A and 5B are explanatory diagrams illustrating an example of a relationship between an influence value and a coefficient.
Figure 5B:
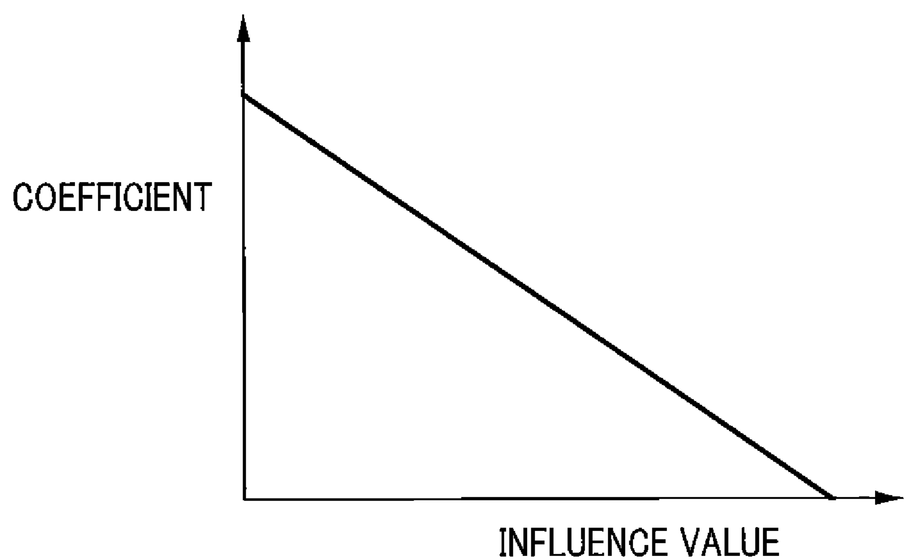

In step S23, the coefficient setting unit 13 specifies a region, separated by the color boundary, which includes a pixel of interest to be convoluted in the arithmetic operation unit 14. In step S24, the coefficient for the convolution operation in each of the pixels within the region specified in step S23 is calculated in accordance with the influence value. In FIG. 3D, the pixel shown by intersecting the diagonal line is set to a pixel of interest, and the region specified in step S23 is shown by the diagonal line. In addition, the example of the calculated coefficients is shown in FIG. 3E. The pixels except for the region specified in step S23 are excluded from the convolution operation in the arithmetic operation unit 14 without creating the coefficient, or the coefficient thereof is set to 0. In the example shown in FIG. 3E, the coefficient is set to 0. For the region specified in step S23, the coefficient is set smaller as the influence value is larger, and the coefficient is set larger as the influence value is smaller. FIGS. 5A and 5B are explanatory diagrams illustrating an example of a relationship between the influence value and the coefficient. When the coefficient is calculated from the influence value, it may be calculated using various functions in which the coefficient decreases with an increase in the influence value, for example, such as a graphical function shown in FIG. 5A or a graphical function shown in FIG. 5B.

In step S25, using the coefficients calculated in step S24, each of the coefficients is divided by the sum of the coefficients and is normalized. The convolution operation is then performed by obtaining the sum of products of the normalized coefficient and each of the pixel values, and the color value after processing in the pixel of interest is calculated. That is, when the coefficient calculated in step S24 is set to Pi, the sum of the coefficients is set to S, and each of the pixel values is set to Ci, the following expression may be calculated.

$$\Sigma_i(Pi/S)\cdot Ci$$

Since the value of the pixel within the region, separated by the color boundary, which includes the pixel of interest is used (the pixels except for the region are not used, or the coefficient is 0 and thus the value is not reflected in the sum thereof), this arithmetic operation is not influenced by the pixel in which a different color is used. In addition, since the coefficient increases with increasing distance from the color boundary, the color with increasing distance from the color boundary is used. For this reason, even in the pixel influenced by a defect generated in the color boundary, the color value is corrected depending on the color far located from the color boundary which is used in the portion thereof.

Meanwhile, the region to be processed which includes the pixel of interest is set in the above-mentioned processing, and the color value of the pixel of interest is obtained by the convolution operation. In such processing, each of the pixels of the given image is set to a pixel of interest in order, and the above-mentioned processing may be performed on each of the pixels of interest. Alternatively, when the extraction of the color boundary or the calculation of the influence value is performed on the entire image in advance, the setting of the coefficient and the processing of the convolution operation may be performed at the time of the processing of each of the pixels of interest.

Figure 6A:
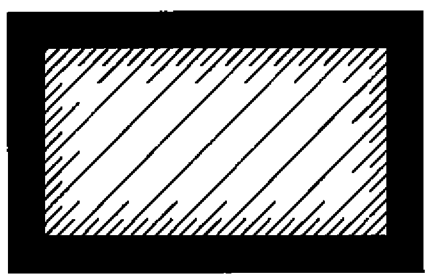
FIGS. 6A to 6F are explanatory diagrams illustrating an example of an image before and after processing according to the first exemplary embodiment of the invention.
Figure 6B:
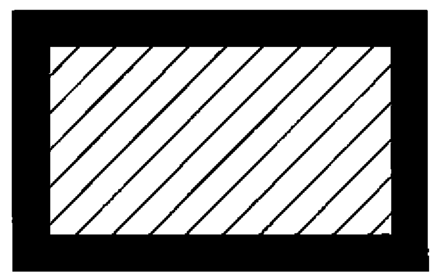

FIGS. 6A to 6F are explanatory diagrams illustrating an example of an image before and after processing according to the first exemplary embodiment of the invention. FIG. 6A shows an example in which the image obtained by coloring the inside of the black frame is read out by the image reading apparatus. The colored color is shown by the diagonal line, but in the portion in which the black frame and the colored portion come into contact with each other, the color colored due to a reading error is in a blackish state. The pixel having a blackish color is corrected to the color of the colored portion by performing the above-mentioned processing, the image after processing shown in FIG. 6B is obtained. Meanwhile, in the image which is read out in the image reading apparatus, the color of the black frame also changes due to the influence of the colored portion in the color boundary, but the pixel herein is also corrected to the color of the black frame.

Figure 6C:
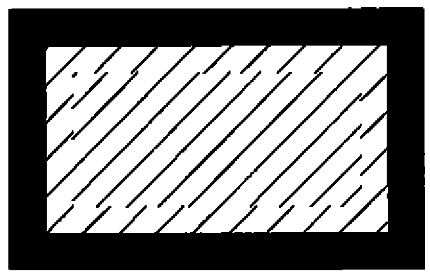
Figure 6D:
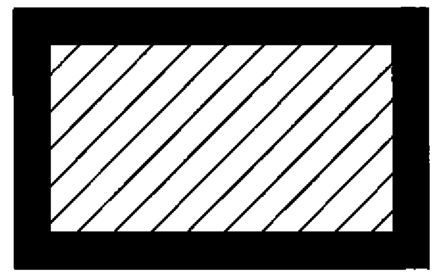

FIG. 6C shows an example in which enhancement filtering is performed on the image obtained by coloring the inside of the black frame, and the image is excessively enhanced. The colored color is shown by the diagonal line, but in the portion in which the black frame and the colored portion come into contact with each other, the color of the colored portion is lighter than the color of other colored portions (shown by extending the distance between the diagonal lines) by enhancement filtering, and this portion is viewed by an observer in the state where it is rimmed between the black frame and the colored portion. The portion having a lightened color is corrected to the color of the colored portion by performing the above-mentioned processing on such an image, and the image after processing shown in FIG. 6D is obtained.

Figure 6E:
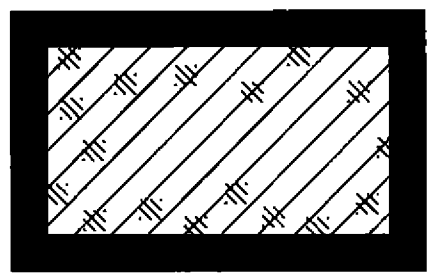
Figure 6F:
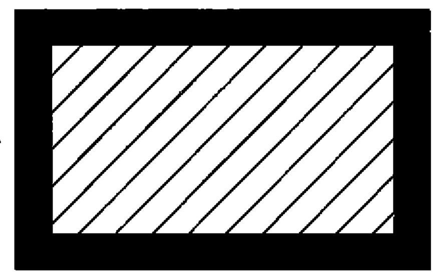

FIG. 6E shows an example in which the image obtained by coloring the inside of the black frame is compressed and extended using a JPEG type. The JPEG type is an irreversible compression type, and a noise component of which the color changes is generated in the extended image by the discrete cosine transform, the quantization of a conversion coefficient, and the like. This noise component is generally called a mosquito noise, and is caused by the generation of a high-frequency component due to the step difference of the color in the color boundary. The noise component is corrected to the color of other colored portions by performing the above-mentioned processing on such an image, and the image after processing shown in FIG. 6F is obtained. The noise component is not necessarily generated in the extending direction of the color boundary, but the noise component is corrected by the above-mentioned processing.

In this manner, in the image of which the color value is corrected by the convolution operation, the color change decreases further than before processing due to the suppression of the influence in the color boundary, and thus the image before influenced by the color boundary is reproduced. In addition, for example, when the image is compressed, the amount of data in which the image after processing is compressed decreases further than the case in which the image before processing is compressed. Further, for example, when the representative color is extracted and limit coloring is performed, the representative color is extracted without being influenced by the color boundary, and unexpected replacement with the representative color due to the influence of the color boundary is not performed even at the time of the color replacement.

Figure 7:
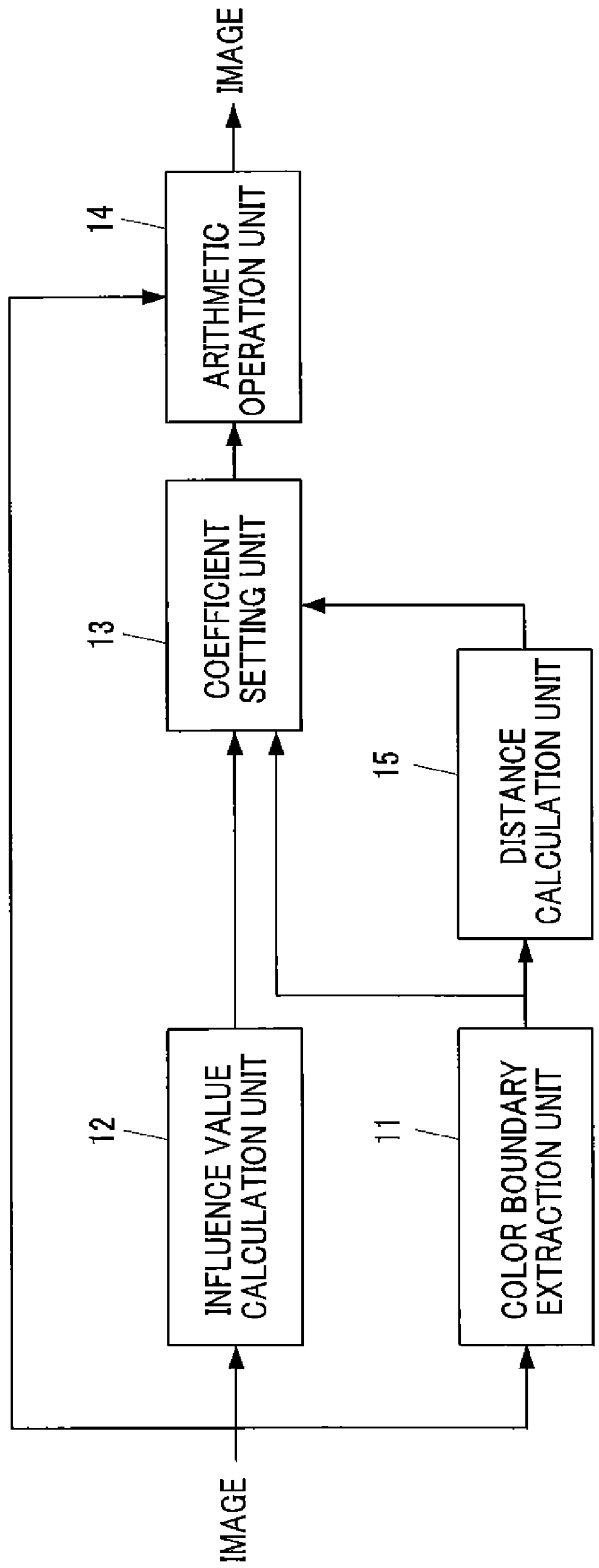
FIG. 7 is a configuration diagram illustrating a second exemplary embodiment of the invention.

FIG. 7 is a configuration diagram illustrating a second exemplary embodiment of the invention. In the drawing, 15 denotes a distance calculation unit. Portions different from those of the first exemplary embodiment of the invention mentioned above will be chiefly described. In the second exemplary embodiment, the distance calculation unit 15 is included in addition to the configuration of the first exemplary embodiment.

The distance calculation unit 15 calculates the distance from the color boundary extracted in the color boundary extraction unit 11 in each of the pixels. As a method of calculating the distance, a method used hitherto may be used. For example, the Euclidean distance from each of the pixels to the closest color boundary on the image plane may be obtained, filter processing for generating a distance image may be performed, and other methods may be used.

The coefficient setting unit 13 sets a coefficient for the convolution operation, together with the influence value calculated in the influence value calculation unit 12, using the distance from the color boundary calculated in the distance calculation unit 15. The coefficient is set larger as the distance from the color boundary is longer. For example, the value of the coefficient obtained based on the influence value is multiplied by the distance from the color boundary or the rate depending on the distance, and the multiplied value may be set to the coefficient for the convolution operation. Of course, the coefficient for the convolution operation depending on the distance from the color boundary and the influence value may be set using other methods. Meanwhile, although the description has also been made in the first exemplary embodiment, the pixel to be convoluted in the arithmetic operation unit 14 is set to a pixel of interest, so that the setting of the coefficient is performed on the pixel of the region, separated by the color boundary, which includes the pixel of interest. The pixels except for this region are excluded from the convolution operation without setting the coefficient, or the coefficient thereof is set to 0.

The arithmetic operation unit 14 performs the convolution operation using the coefficient set by the coefficient setting unit 13. However, the coefficient is set larger as the distance from the color boundary is longer at the time of setting the coefficient in the coefficient setting unit 13, and thus the value of the pixel with increasing distance from the color boundary is reflected in the result of the convolution operation. Of course, the fact that the pixel with increasing distance from the color boundary is reflected in the result of the convolution operation depending on the influence value is as described in the first exemplary embodiment mentioned above. Meanwhile, when the convolution operation is performed, each of the coefficients is divided by the sum of the used coefficient, and is normalized and then operated. In addition, the fact that when the convolution operation is performed, the coefficient corresponding to the pixel of the region, separated by the color boundary, which includes the pixel of interest to be operated is used, and those of the pixels except for the region are not used, or are operated by setting the coefficient to 0 is also as described in the first exemplary embodiment mentioned above.

Meanwhile, when the distance calculated in the distance calculation unit 15 is in the range of a predetermined value, the setting of the coefficient by the coefficient setting unit 13 and the convolution operation by the arithmetic operation unit 14 are performed. Otherwise, the convolution operation by the arithmetic operation unit 14 or the further setting of the coefficient by the coefficient setting unit 13 may not be performed. The processing amount decreases as compared to the case in which the setting the coefficient and the convolution operation are performed in all the pixels. Of course, in combination with whether the influence value calculated in the influence value calculation unit 12 as described in the first exemplary embodiment is in the range of a predetermined value, the setting of the coefficient and the convolution operation may be performed when at least one is in the range thereof, or the setting of the coefficient and the convolution operation may not be performed when either one is out of the range thereof.

Figure 8:
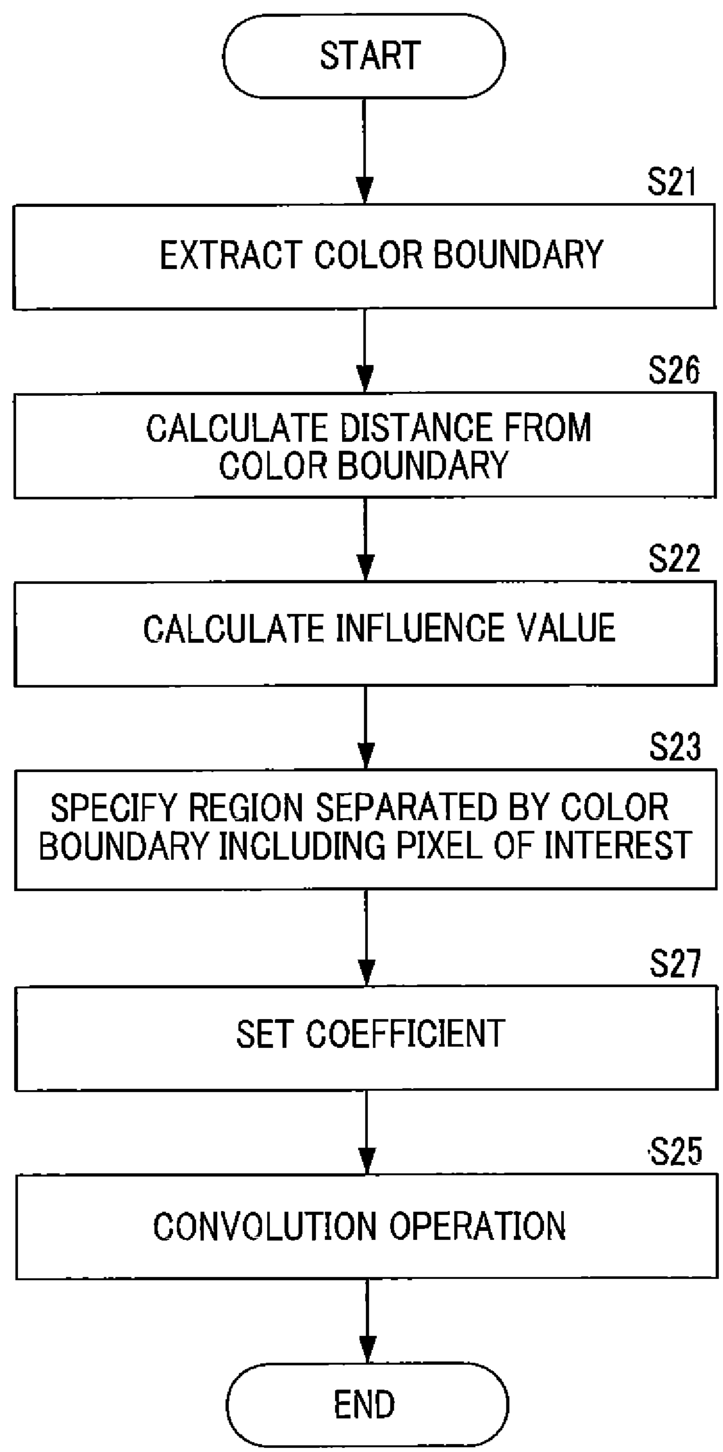
FIG. 8 is a flow diagram illustrating an example of an operation according to the second exemplary embodiment of the invention.

FIG. 8 is a flow diagram illustrating an example of the operation according to the second exemplary embodiment of the invention, and FIGS. 9A to 9G are explanatory diagrams illustrating a specific example in an example of the operation according to the second exemplary embodiment of the invention. In the flow of processing shown in FIG. 8, processing of step S26 is added to the flow of the processing in the first exemplary embodiment shown in FIG. 2, the processing of setting the coefficient in step S24 of FIG. 2 is changed to processing of setting the coefficient based on the distance in step S27. In addition, the image shown in FIG. 3A is shown in FIG. 9A, the example of the color boundary shown in FIG. 3B is shown in FIG. 9B, the example of the influence value shown in FIG. 3C is shown in FIG. 9C, and the example of the separated region including the pixel of interest for the influence value shown in FIG. 3D is shown in FIG. 9D, respectively again. Processing different from that of the first exemplary embodiment as described with reference to FIG. 2 and FIGS. 3A to 3E will be chiefly described.

The color boundary extraction unit 11 extracts the color boundary of the image in step S21, and then in step S26, the distance calculation unit 15 calculates the distance from the color boundary extracted by the color boundary extraction unit 11 in each of the pixels. In this example, the distance from the color boundary is set depending on the number of pixels up to the closest color boundary. An example of the distance calculated from the extraction result of the color boundary in FIG. 9B is shown in FIG. 9E.

On the other hand, although the influence value is calculated by the influence value calculation unit 12 in step S22, the processing has been described in the first exemplary embodiment and thus the description herein will be omitted. An example of the calculated influence value is shown in FIG. 9C. Meanwhile, any of the processing of steps S21 and S26 in FIG. 8 and the processing of step S22 may be first performed, and may be performed in parallel.

The coefficient setting unit 13 specifies the region, separated by the color boundary, which includes the pixel of interest to be convoluted in the arithmetic operation unit 14 in step S23, and then in step S27, calculates the coefficient for the convolution operation in each of the pixels within the region specified in step S23, in accordance with the distance from the influence value calculated in step S22 and the color boundary calculated in step S26. In FIGS. 9D and 9F, the pixel shown by intersecting the diagonal line is set to a pixel of interest, and the region specified in step S23 is shown by the diagonal line. In addition, the example of the calculated coefficients is shown in FIG. 9G. The coefficient takes a larger value as the influence value is smaller and the distance is larger, and the coefficient takes a smaller value as the influence value is larger and the distance is smaller. For example, the value of the coefficient to be set may be obtained based on the linear sum or the like of the coefficient and distance which are obtained from the influence value using the method described in the first exemplary embodiment.

In this manner, using the coefficient set in step S27, the arithmetic operation unit 14 performs the convolution operation in step S25, and thus may calculate the color value after processing in the pixel of interest. At that time, the coefficient calculated in step S27 is divided by the sum of the coefficients and is normalized. Meanwhile, in the processing of steps S27 and S25, the pixels except for the region specified in step S23 are as described in the first exemplary embodiment.

Meanwhile, in an example of the operation in the second exemplary embodiment, in addition to the setting of the region to be processed including the pixel of interest, and the execution of the processing for obtaining the color value of the pixel of interest by the convolution operation using each of the pixels of the given image as the pixel of interest in order, the extraction of the color boundary, the calculation of the influence value, or the calculation of the distance may be performed on the entire image in advance, and the setting of the coefficient and the processing of the convolution operation may be performed when each of the pixels of interest is processed.

In the second exemplary embodiment, since the distance from the color boundary is used together with the influence value, there is a strong tendency to attach importance to the value of the pixel distant from the color boundary as compared to the case in which the distance from the color boundary is not used, and thus the influence due to the color boundary is reduced further from the value of the pixel after processing.

Figure 10:
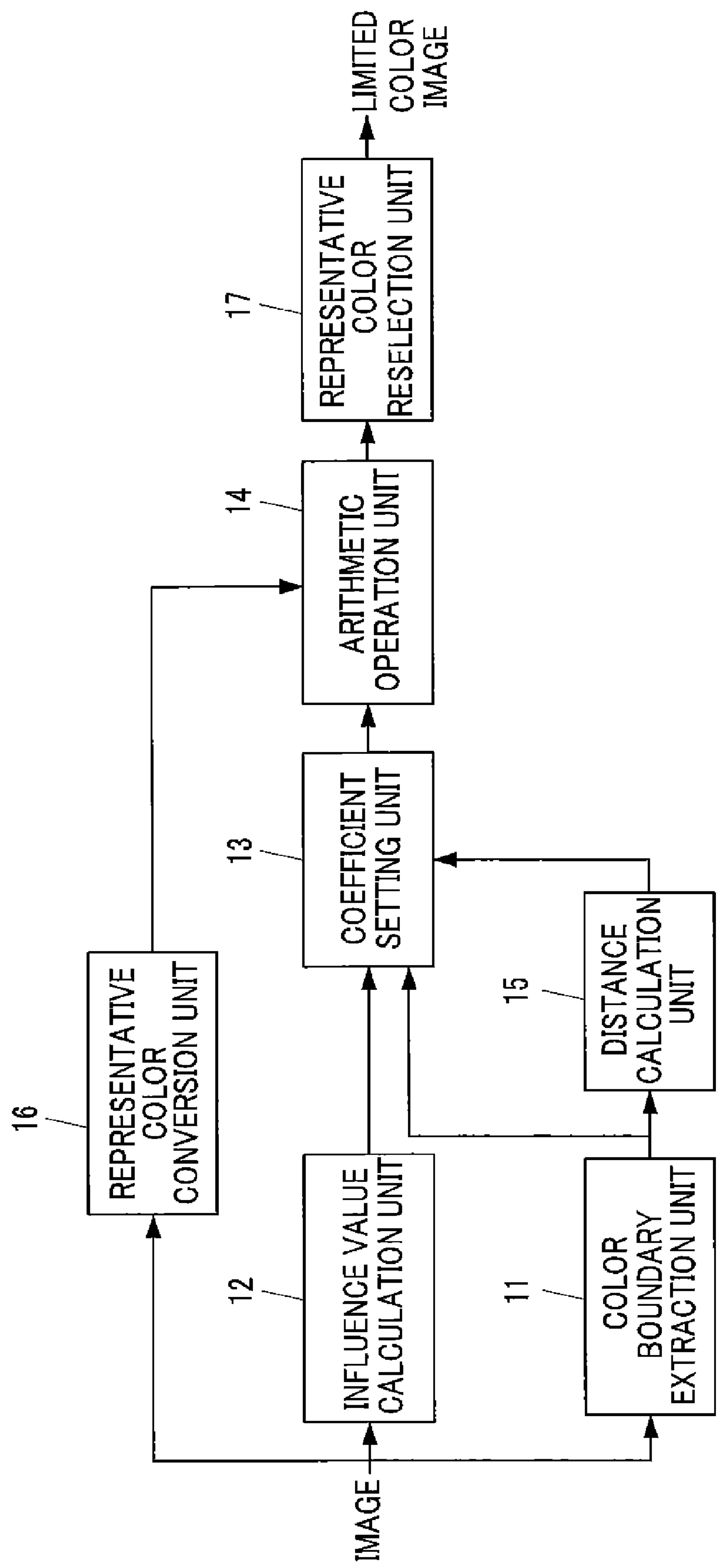
FIG. 10 is a configuration diagram illustrating a third exemplary embodiment of the invention.

FIG. 10 is a configuration diagram illustrating a third exemplary embodiment of the invention. In the drawing, 16 denotes a representative color conversion unit, and 17 denotes a representative color reselection unit. Portions different from those of the second exemplary embodiment of the invention mentioned above will be chiefly described. In the third exemplary embodiment, the representative color conversion unit 16 and the representative color reselection unit 17 are included in addition to the configuration of the second exemplary embodiment.

The representative color conversion unit 16 selects the representative colors from the image and converts the color of the image into any of the representative colors, to generate a limited color image in which the used color is limited to the representative color. As a method of selecting the representative color and converting the color of the image into the representative color, a method known hitherto may be used.

Although the arithmetic operation unit 14 performs the convolution operation on the given image in the first and second exemplary embodiments mentioned above, the arithmetic operation unit performs the convolution operation on the limited color image in which the color conversion into the representative color is performed by the representative color conversion unit 16.

The representative color reselection unit 17 reselects the representative color from the limited color image in which the convolution operation is performed by the arithmetic operation unit 14. The reselected representative color may be used in any of the applications. However, herein, the limited color image is obtained again by performing the color conversion into the reselected representative color, for example, on the limited color image after the convolution operation is performed by the arithmetic operation unit 14. Of course, the reselected representative color may be output as a processing result. Meanwhile, a configuration may be made in which the processing result of the arithmetic operation unit 14 is output, and the representative color reselection unit 17 is not provided.

Figure 11:
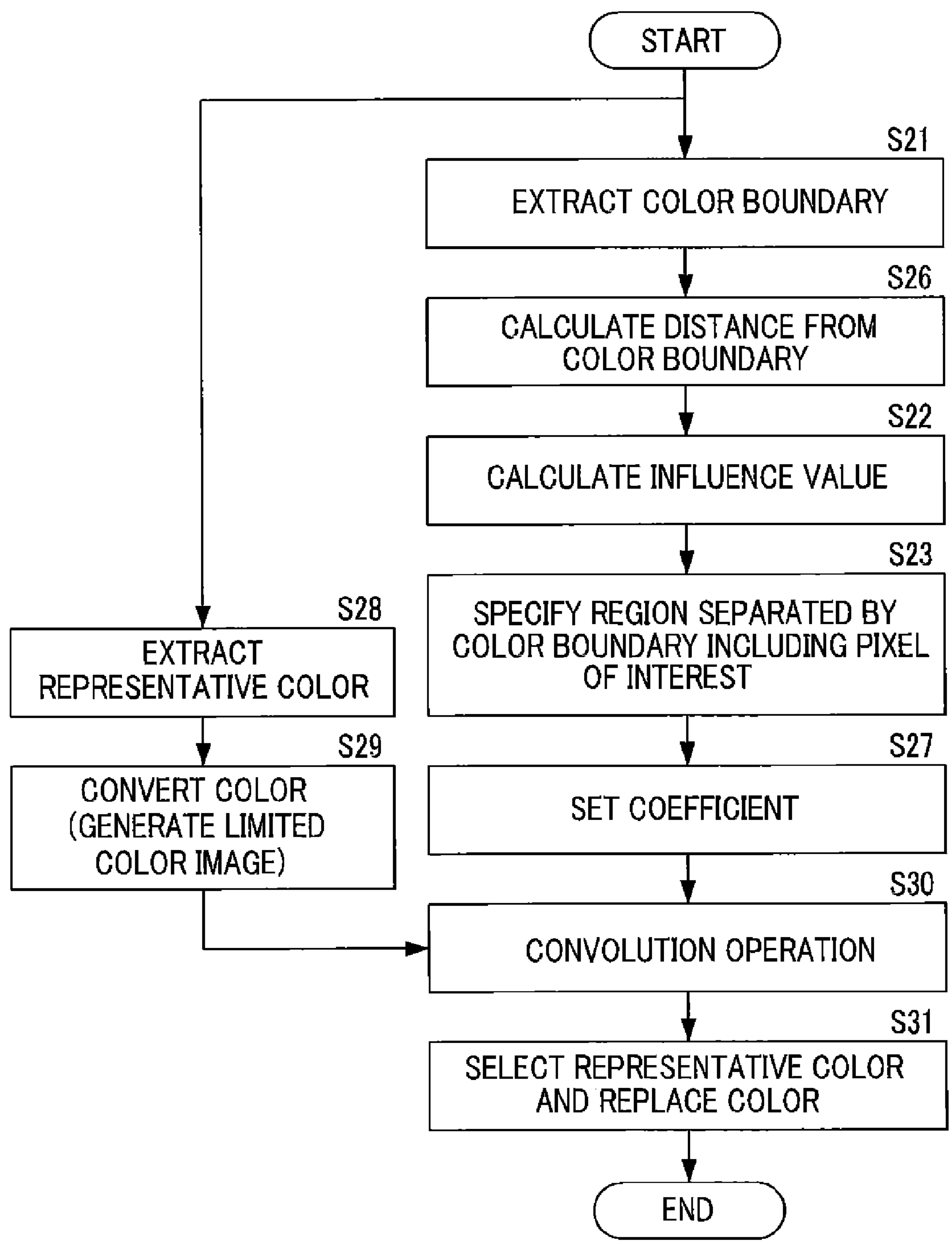
FIG. 11 is a flow diagram illustrating an example of an operation according to the third exemplary embodiment of the invention.

FIG. 11 is a flow diagram illustrating an example of an operation according to the third exemplary embodiment of the invention, and FIGS. 12A to 12I are explanatory diagrams illustrating a specific example in an example of the operation according to the third exemplary embodiment of the invention. In the flow of processing shown in FIG. 11, processing of steps S28, S29, and S31 is added to the flow of the processing in the second exemplary embodiment shown in FIG. 8, and the processing of the convolution operation of step S25 in FIG. 8 is changed to processing of the convolution operation in which the limited color image in step S30 is used. In addition, in FIGS. 12A to 12I, FIGS. 12H and 12I are added to the example of FIGS. 9A to 9G. Processing different from that of the second exemplary embodiment described with reference to FIG. 8 and FIGS. 9A to 9G and that of the first exemplary embodiment described with reference to FIG. 2 and FIGS. 3A to 3E will be chiefly described.

The processing is as described in the second exemplary embodiment (and the first exemplary embodiment), in which after the color boundary extraction unit 11 extracts the color boundary of the image in step S21, the distance calculation unit 15 calculates, in step S26, the distance from the color boundary extracted by the color boundary extraction unit 11 in each of the pixels, and after the influence value calculation unit 12 calculates the influence value in step S22 and the coefficient setting unit 13 specifies, in step S23, the region separated by the color boundary which includes the pixel of interest, the coefficient for the convolution operation is calculated in step S27. In the processing so far, for example, the coefficients shown in FIG. 12G are obtained.

On the other hand, the representative color conversion unit 16 extracts the representative colors from the image in step S28 and converts the color of the image into any of the representative colors in step S29, to generate a limited color image in which the used color is limited to the representative color. FIG. 12H shows an example of the limited color image in which the color conversion into any of the representative colors is performed on the region to be processed shown in FIG. 12A. The region to be processed is divided into two regions by the color boundary shown in FIG. 12B. However, in the example shown in FIG. 12H, a separate representative color is extracted with respect to the pixel influenced by the color boundary and the color the pixel is converted into the representative color (pixel shown white), which results in a three-color image.

In step S30, using the coefficient calculated in step S27, each of the coefficients is divided by the sum of the coefficients and is normalized. The convolution operation is then performed by obtaining the sum of products of the normalized coefficient and each of the pixel values of the limited color image generated in step S29, and the color value after processing in the pixel of interest is calculated. Meanwhile, the pixel of interest of the limited color image is a pixel corresponding, in position, to the pixel of interest in the original image. In addition, for the other pixels, each corresponding pixel of the limited color image is also multiplied by the coefficient. The normalization of the coefficient and the handling of the pixels except for the region specified in step S23 are as described in the first and second exemplary embodiments.

Figures 12G, 12I:
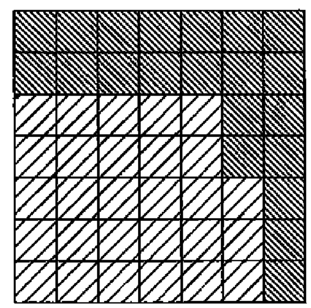

The image shown in FIG. 12I is obtained by performing the convolution operation in step S30 on the limited color image shown in FIG. 12H. For the portion (pixel shown white) of which the color is converted into a separate representative color by the influence of the color boundary in the limited color image shown in FIG. 12H, the color (representative color) of the pixel far located from the color boundary is valued in the convolution operation and thus the color thereof is changed.

After the convolution operation is performed in step S20 in this example, the representative color is reselected by the representative color reselection unit 17 in step S31. Further, the color conversion into the limited color image in which the used color is limited to the reselected representative color is performed on the limited color image obtained in step S30 or the given image. Thereby, the limited color image free of the influence of the color boundary is also obtained with respect to the pixel of which the color is converted into a color different from that of the inside by the influence of the color boundary in the limited color image generated in step S29. Of course, the processing may be terminated by reselecting the representative color.

Meanwhile, in an example of the operation in the third exemplary embodiment, in addition to the setting of the region to be processed including the pixel of interest, and the execution of the processing for obtaining the color value of the pixel of interest by the convolution operation using each of the pixels of the given image as the pixel of interest in order, the extraction of the color boundary, the calculation of the influence value, or the calculation of the distance may be performed on the entire image in advance, and the setting of the coefficient and the processing of the convolution operation may be performed when each of the pixels of interest is processed. Of course, the extraction of the representative color and the generation of the limited color image may be performed in advance. In addition, the re-extraction of the representative color and the generation of the limited color image using the re-extracted representative color may be performed after the processing of the convolution operation for each pixel is terminated.

In the third exemplary embodiment, since the convolution operation is performed using the limited color image in which the representative color conversion is performed in advance, the operation is performed on the image having a small change in the color as compared to the case in which the original image is used, and the operation result has a decreasing influence of the color boundary. Meanwhile, the configuration of the first exemplary embodiment may be provided with the representative color conversion unit 16 or, further, the representative color reselection unit 17. In this case, the convolution operation may be performed in the arithmetic operation unit 14 using the limited color image in which the color conversion is performed by the representative color conversion unit 16.

Figure 13:
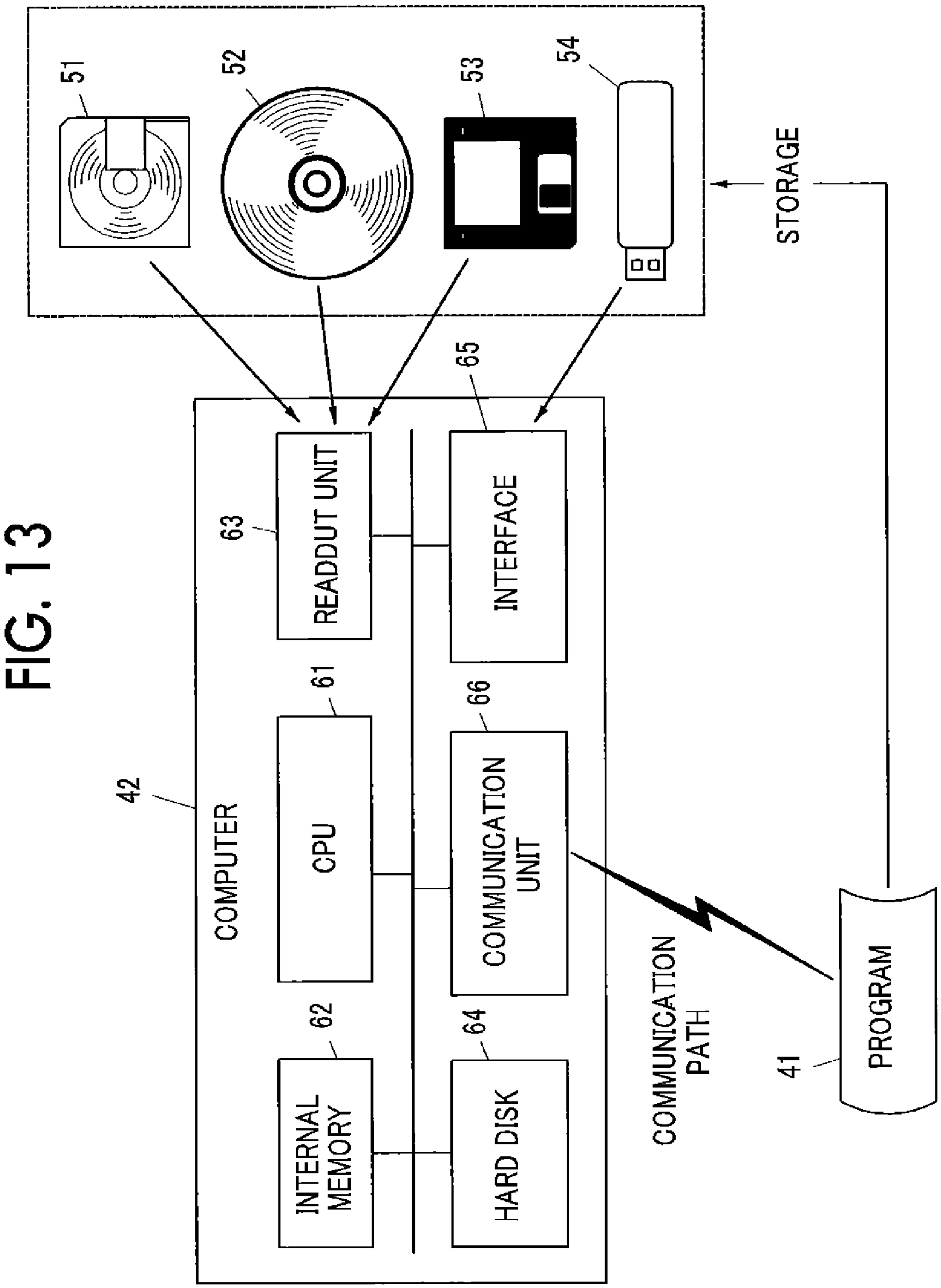
FIG. 13 is an explanatory diagram illustrating an example of a computer program when functions described in the exemplary embodiment of the invention are realized by a computer program, a recording medium having the computer program stored thereon, and a computer.

FIG. 13 is an explanatory diagram illustrating an example of a computer program when functions described in the exemplary embodiment of the invention are realized by a computer program, a recording medium having the computer program stored thereon, and a computer. In the drawing, 41 denotes a program, 42 denotes a computer, 51 denotes a magneto-optical disk, 52 denotes an optical disk, 53 denotes a magnetic disk, 54 denotes a memory, 61 denotes a CPU, 62 denotes an internal memory, 63 denotes a readout unit, 64 denotes a hard disk, 65 denotes an interface, and 66 denotes a communication unit.

The function of each of the units described in the exemplary embodiment of the invention mentioned above may be entirely or partially realized by the program 41 for causing a computer to execute the function. In that case, the program 41, data used by the program and the like may be stored in a recording medium read out by a computer. The recording medium is a medium that causes change states of magnetic, optical, and electrical energy or the like in response to the content description of a program with respect to the readout unit 63 included in hardware resources of a computer, and transfers the content description of a program to the readout unit 63 in the form of signals corresponding thereto. For example, the recording medium includes the magneto-optical disk 51, the optical disk 52 (including a CD, a DVD and the like), the magnetic disk 53, the memory 54 (including an IC card, a memory card, a flash memory and the like) and the like. Of course, the recording medium is not limited to a portable type.

When the program 41 is stored in such a recording medium, the program 41 is read out from a computer, for example, by mounting the recording medium in the readout unit 63 or the interface 65 of the computer 42 and is stored in the internal memory 62 or the hard disk 64 (including a magnetic disk or a silicon disk and the like), and the function described in the exemplary embodiment of the invention mentioned above is all or partially realized by executing the program 41 using the CPU 61. Alternatively, the program 41 is transferred to the computer 42 through a transmission channel, the program 41 is received in the communication unit 66 of the computer 42 and is stored in the internal memory 62 or the hard disk 64, and the above-mentioned function may be realized by executing the program 41 using the CPU 61.

The computer 42 may be connected to various devices through another interface 55. Of course, the configuration may be partially configured by hardware, and may be entirely configured by hardware. Alternatively, the configuration may be configured as a program including all or a portion of the functions described in the exemplary embodiment of the invention along with another configuration. When the configuration is applied to another application, it may be integrated with a program in the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a memory that stores instructions; and a processor configured to execute the instructions to act as:

an extraction unit that extracts a color boundary of an image;

an influence value calculation unit that calculates an influence value indicating the degree of an influence of the color boundary on a pixel;

a setting unit that sets a coefficient for a convolution operation in accordance with the color boundary extracted in the extraction unit and the influence value calculated in the influence value calculation unit;

an operation unit that performs a convolution operation using the coefficient set by the setting unit; and a distance calculation unit that calculates a distance from the pixel to the color boundary extracted in the extraction unit, wherein the setting unit sets the coefficient using the distance calculated in the distance calculation unit together with the influence value, the influence value is calculated based on an absolute value of a difference of a pixel color from an average color of a local region or a color difference within a local region, and the influence value becomes larger as the pixel is closer to the color boundary and the influence value becomes smaller as the pixel is farther from the color boundary.

2. The image processing apparatus according to claim 1, wherein the setting unit and the operation unit perform the setting of the coefficient and the convolution operation when the distance calculated in the distance calculation unit is in a predetermined range.

3. The image processing apparatus according to claim 2, wherein the setting unit and the operation unit perform the setting of the coefficient and the convolution operation when the influence value is in a predetermined range.

4. The image processing apparatus according to claim 2, further comprising:

a conversion unit that selects representative colors from the image to convert a color of the image into any of the representative colors, wherein the operation unit performs the convolution operation on the image converted by the conversion unit.

5. The image processing apparatus according to claim 4, wherein the setting unit and the operation unit perform the setting of the coefficient and the convolution operation when the influence value is in a predetermined range.

6. The image processing apparatus according to claim 4, further comprising:

a reselection unit that reselects the representative colors from the image on which the convolution operation is performed by the operation unit.

7. The image processing apparatus according to claim 6, wherein the setting unit and the operation unit perform the setting of the coefficient and the convolution operation when the influence value is in a predetermined range.

8. The image processing apparatus according to claim 1, further comprising:

a conversion unit that selects representative colors from the image to convert a color of the image into any of the representative colors, wherein the operation unit performs the convolution operation on the image converted by the conversion unit.

9. The image processing apparatus according to claim 8, wherein the setting unit and the operation unit perform the setting of the coefficient and the convolution operation when the influence value is in a predetermined range.

10. The image processing apparatus according to claim 8, further comprising:

a reselection unit that reselects the representative colors from the image on which the convolution operation is performed by the operation unit.

11. The image processing apparatus according to claim 10, wherein the setting unit and the operation unit perform the setting of the coefficient and the convolution operation when the influence value is in a predetermined range.

12. The image processing apparatus according to claim 1, further comprising:

a reselection unit that reselects the representative colors from the image on which the convolution operation is performed by the operation unit.

13. The image processing apparatus according to claim 12, wherein the setting unit and the operation unit perform the setting of the coefficient and the convolution operation when the influence value is in a predetermined range.

14. The image processing apparatus according to claim 1, wherein the setting unit and the operation unit perform the setting of the coefficient and the convolution operation when the influence value is in a predetermined range.

15. A non-transitory computer readable medium storing a program causing a computer to execute the functionality of the image processing apparatus according to claim 1.

16. The image processing apparatus according to claim 1, wherein the influence value calculation unit calculates a plurality of influence values, each influence value indicating the degree of an influence of the color boundary one of a plurality of pixels in the image, wherein the setting unit sets a coefficient for each pixel subsequent to the functionality of the extraction unit and the influence value calculation unit upon the entire image, and the operation unit performing the convolution operation for each pixel subsequent to the functionality of the extraction unit and the influence value calculation unit upon the entire image.

17. The image processing apparatus according to claim 1, wherein the functionality of the extraction unit and the influence value calculation unit are performed in parallel.

18. An image processing method comprising:

extracting a color boundary of an image;

calculating an influence value indicating the degree of an influence of the color boundary on a pixel;

setting a coefficient for a convolution operation in accordance with the extracted color boundary and the calculated influence value;

performing a convolution operation using the set coefficient; and calculating a distance from the pixel to the extracted color boundary, wherein the coefficient is set using the distance calculated from the extracted color boundary together with the influence value, the influence value is calculated based on an absolute value of a difference of a pixel color from an average color of a local region or a color difference within a local region, and the influence value becomes larger as the pixel is closer to the color boundary and the influence value becomes smaller as the pixel is farther from the color boundary.

* * * * *